United States Patent
Bachinski et al.

(10) Patent No.: US 6,452,542 B1
(45) Date of Patent: Sep. 17, 2002

(54) INTEGRATED FLIGHT MANAGEMENT SYSTEM

(75) Inventors: Thomas J. Bachinski, Lakeville; Steve F. Alwin, Saint Paul; Eric J. Rach, Burnsvillle, all of MN (US)

(73) Assignee: Rosemount Aerospace Inc., Burnsville, MN (US)

(*) Notice: Subject to any disclaimer, the term of this patent is extended or adjusted under 35 U.S.C. 154(b) by 0 days.

(21) Appl. No.: 09/798,439

(22) Filed: Mar. 2, 2001

(51) Int. Cl.[7] ............................ G01S 5/02; H04B 7/185; G01C 21/00; G06G 7/78
(52) U.S. Cl. .................... 342/357.06; 701/3; 701/6; 701/213
(58) Field of Search ................... 342/357.06, 357.14; 701/3, 6, 7, 14, 213

(56) References Cited

U.S. PATENT DOCUMENTS

| | | | |
|---|---|---|---|
| 2,970,475 A | 2/1961 | Werner | 73/339 |
| 4,458,137 A | 7/1984 | Kirkpatrick | 219/201 |
| 4,947,165 A | 8/1990 | Zweifel | 340/968 |
| 5,080,496 A | 1/1992 | Keim et al. | |
| 6,084,542 A | * 4/2000 | Wright et al. | 342/357.13 |
| 6,070,475 A | 6/2000 | Muehlhauser et al. | 73/861.68 |
| 6,076,963 A | 6/2000 | Menzies et al. | 374/138 |

FOREIGN PATENT DOCUMENTS

| | | |
|---|---|---|
| EP | 629 845 | 12/1994 |
| WO | WO 95/00825 | 1/1995 |
| WO | WO 95/08122 | 3/1995 |

OTHER PUBLICATIONS

Journal: IEEE Aerospace and Electronic Systems Magazine, Apr. 1994, V9, N4; pp. 7–14.

* cited by examiner

Primary Examiner—Thomas H. Tarcza
Assistant Examiner—Fred H. Mull
(74) Attorney, Agent, or Firm—Westman, Champlin & Kelly, P.A.

(57) ABSTRACT

A smart probe assembly for an aircraft includes pressure sensing ports for sensing pressures indicating angle of attack, static pressure and pitot pressure, a circuit housing mounted on said probe includes cards for a central processing unit, and also includes a global positioning satellite receiver. An antennae for the global positioning satellite receiver is mounted adjacent to the probe, on a mounting plate so that the antennae is protruding from the aircraft without cutting an additional hole in the aircraft skin, the inputs from the global positioning satellite are used for providing various flight performance information.

17 Claims, 5 Drawing Sheets

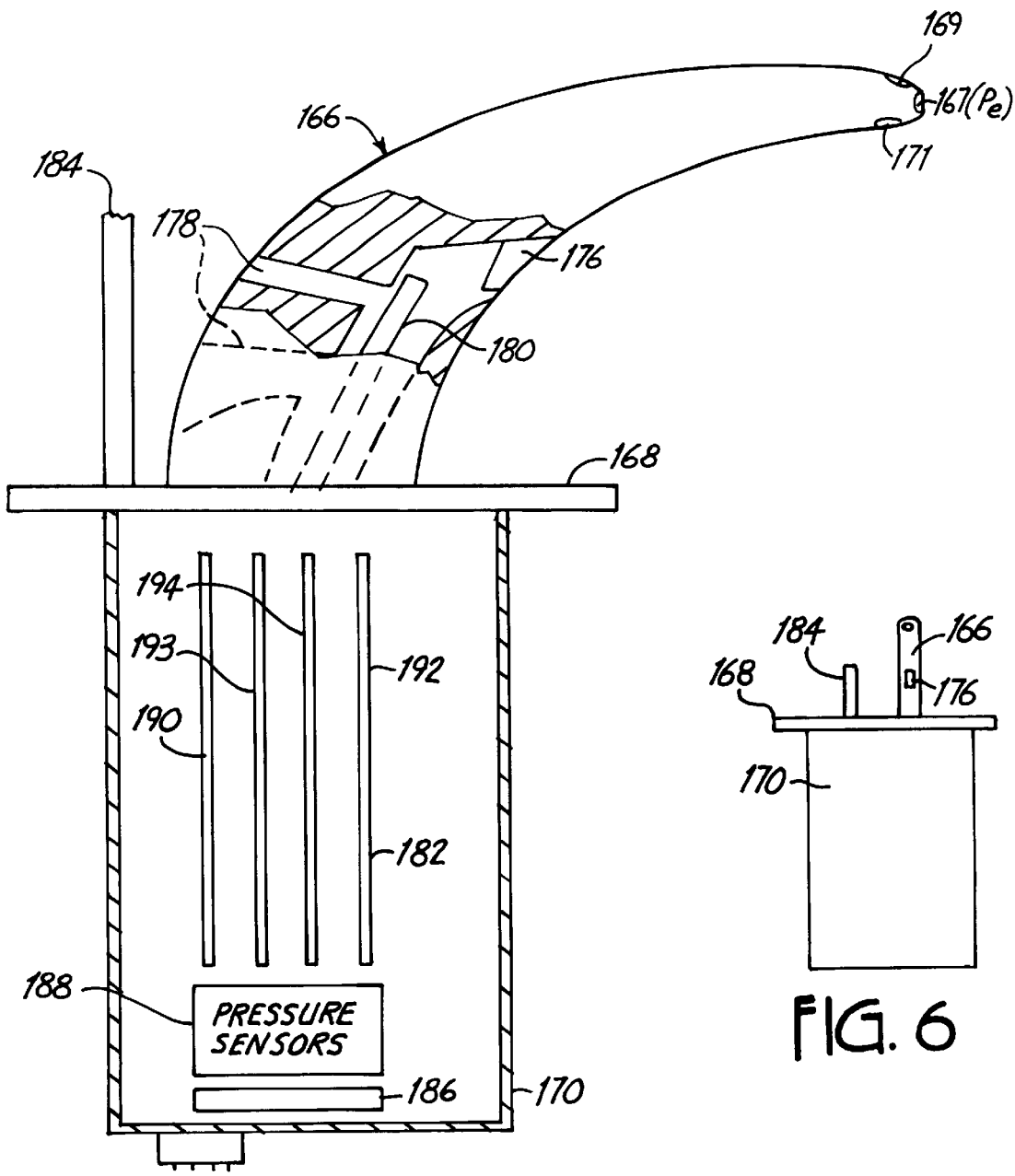

INTEGRATED FLIGHT MANAGEMENT SYSTEM

BACKGROUND OF THE INVENTION

The present invention relates to an integrated flight control system for an aircraft that includes at least one smart probe having an internal computer card or central processing unit, which receives input data or signals including solid state inertial reference, pressure inputs. angle of attack, and temperatures, and further having a global positioning satellite (GPS) receiver circuit included as part of the smart probe. The GPS receiver also provides inputs to the central processing unit.

In the prior art various smart probe assemblies have been advanced where the probes have housings with microprocessors and which receive pressure sensor inputs, temperature sensor inputs, and angle of a attack inputs. The smart probe microprocessor will provide the desired output signals to various controls or displays. Smart probes can be redundant, or in other words two different probes can be connected so the data from one probe can be fed to the other for determining information such as differential pressure that indicates aircraft side slip.

At present, however, the probes are not capable of determining the ground speed, aircraft attitude, latitude, longitude, track, turn rate, or GPS altitude, which outputs can be provided with existing global positioning satellite receivers.

SUMMARY OF THE INVENTION

The present invention relates to the determination of various parameters during flight, utilizing a smart probe arrangement, that will not only provide the basic information of pressure, total air temperature (TAT) and other physical parameters, but also will provide information that is available from global positioning satellite signals. These include longitude, latitude, ground speed, turn rate, GPS altitude and similar information.

The present probe further includes accelerometers and rate sensors on a circuit card or cards wherein the accelerometers are positioned to sense Inertial forces in the three mutually perpendicular axes. A magnetometer for determining the magnetic field of the earth at the aircraft location can be provided so that the accelerometers can be used for determining the position of the aircraft or air vehicle during operation.

The accelerometers and rate sensors further provide information, in connection with the global positioning satellite receiver as to the pitch, roll, yaw and magnetic heading of the aircraft. The difference between the aircraft track, as determined by the GPS receiver, and the magnetic heading provides angle of side slip, for example. The algorithms for determining these outputs can be placed in the smart probe processor, and the information can be substantially instantaneously transmitted to a flight management system, or on board avionics including cockpit displays, or automatic pilot controls.

By adding additional circuit cards into the card rack of a smart probe, and providing a small antennaes for the global positioning satellite receiver, that does not substantially affect the drag of the aircraft, the determination of the aircraft position and other parameters can be obtained without having a large number of different. probes, and antennaes.

BRIEF DESCRIPTION OF THE DRAWINGS

FIG. 5 is a top view of a probe shown in greater detail and schematically showing an instrumentation housing; and FIG. 6 is a front view of the probe of FIG. 5.

DETAILED DESCRIPTION OF THE PREFERRED EMBODIMENTS

Figure 1:
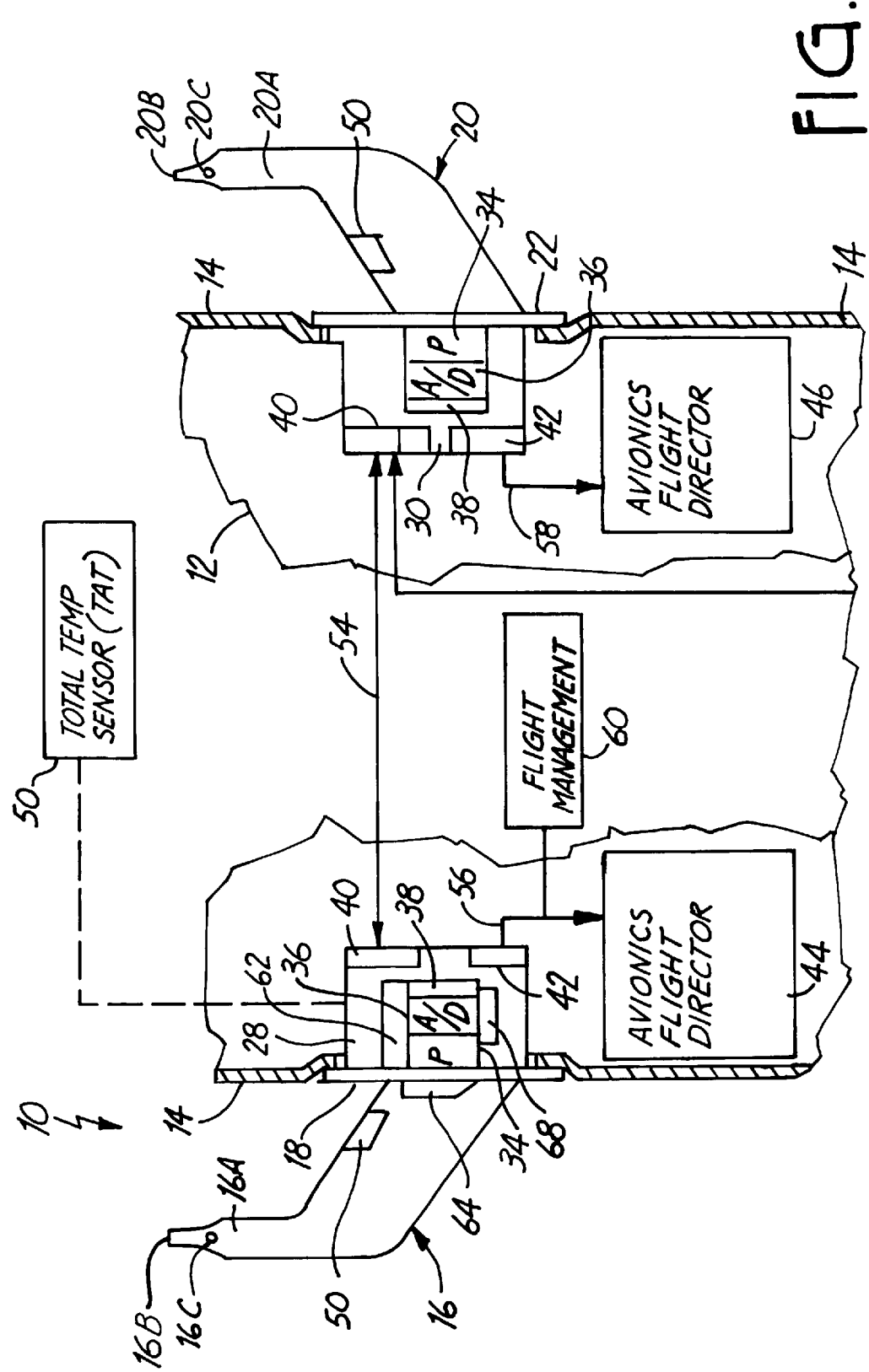
FIG. 1 is a schematic representation of a typical flight management system utilizing smart probes having circuitry according to the present invention.
Figure 2:
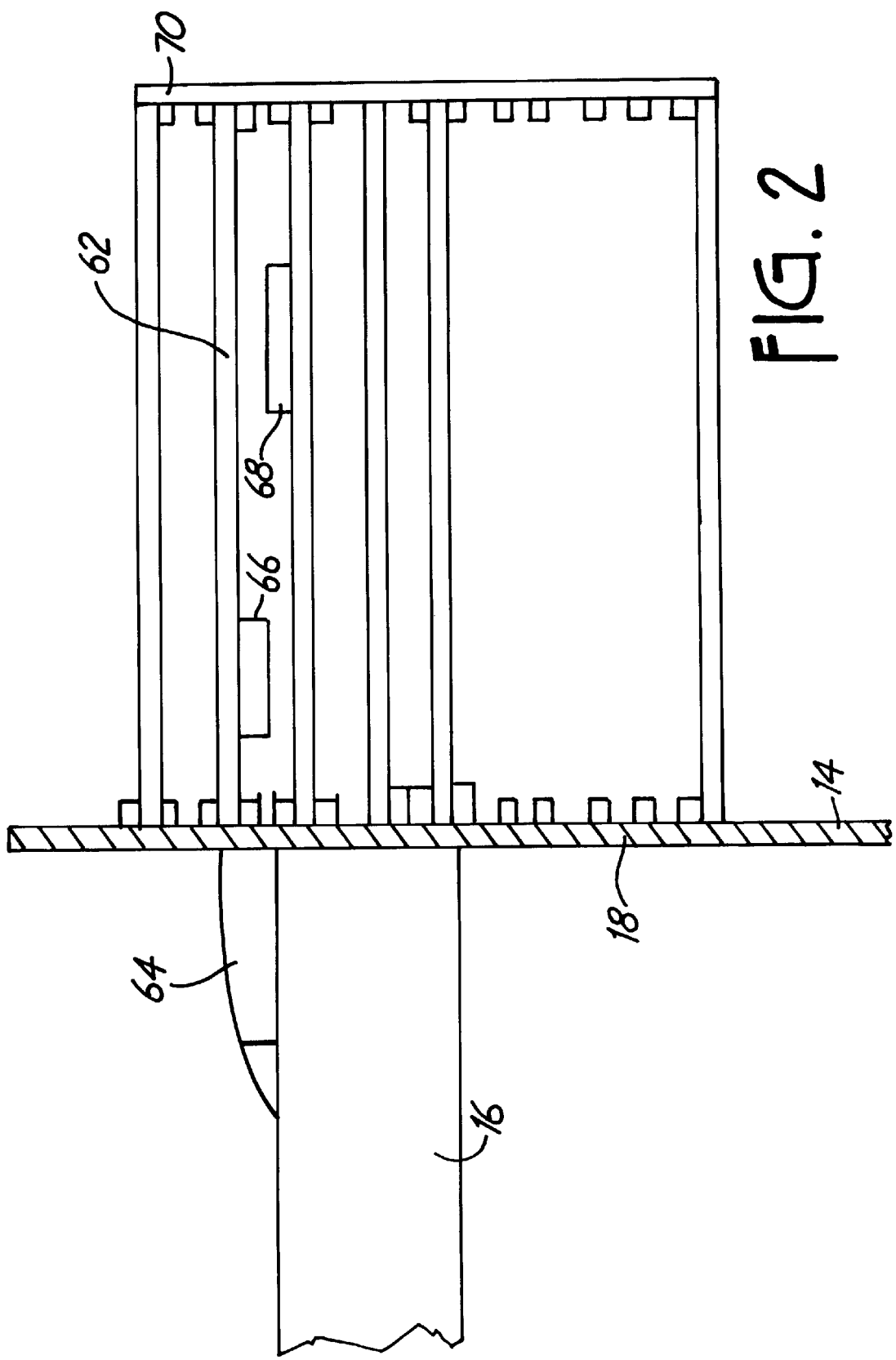
FIG. 2 is a fragmentary rear view of a probe and a typical housing or bracket and circuit cards utilized with the smart probes of FIG. 1.

Referring first to FIG. 1, a flight director system is shown generally at 10 and is installed on an aircraft or air vehicle 12, which has. a skin 14 that forms an outer wall. While the aircraft is shown fragmented into sections, the mounting of the probes is generally along the sides of the fuselage. A typical smart external air data sensing probe shown at 16 is mounted on a suitable face mounting plate 18 which is attached to the skin 14. In addition, if desired, a second smart air data sensing probe 20 is mounted on a mounting plate 22 on an opposite side of the aircraft from the first smart probe 16. The probe configuration can be any desired configuration, and specifically, the probe can be a suitable probe such as those. shown in U.S. Pat. No. 4,378,696 or U.S. Pat. No. 4,096,744, and preferably, including an integral total temperature sensor installed in the probe strut such as that shown in U.S. Pat. No. 5,731,507.

The smart probe of the present invention has the functions for providing pitot pressure ($P_t$) static pressure ($P_s$) angle of attack (AOA) and the additional features of global positioning satellite information. Also total air temperature and an inertial reference are provided.

The smart probes 16 and 20 each have barrels that are mounted on struts that extend outwardly from the aircraft skin 14. The barrels 16A and 20A of probe 16 and 20 on opposite sides of the aircraft are shown. The probes have pitot ports at the leading ends which are indicated at 16B and 20B, and angle of attack sensing ports which are typically shown at 16C and 20C. These ports 16C and 20C are on the top and bottom of each probe out near the leading end adjacent the pitot pressure ports 16B and 20B in a known manner. The ports 16C and 20C are positioned so that the angle of attack will cause a differential in pressure at the top and bottom ports and there will be a change in this sensed pressure as the angle of attack changes, as is well known.

The pressure sensing ports 16C and 20C, are designated $P_{\alpha 2}$, and a lower pair of the angle sensing ports which are present on both of the probe barrels is $P_{\alpha 1}$. These pressures along with $P_{tM}$, provides static pressure as well as other functions indicating aircraft performance utilizing pressure data. These signals are all provided in a normal manner that is well known in the field.

The smart probes have a separate housing or rack integrally mounted on the base of the probe as indicated at 28 and 30, respectively. The housings or racks 28 and 30 each include operating circuit cards, and also have pressure sensors indicated generally at 34, A to D converters 36, that form part of a central processor 38 and provide digital signals representing each of the pressures sensed at the ports 16B, 20B, 16C and 20C, and the aligned lower angle of attack sensing ports. These digital signals are provided to the digital central processor circuitry (CPU) 38 in each of the housings. The digital processor circuitry will provide information to data connections or buses 40. The processor circuitry also can have digital data circuits or buses 42 for outputting the processed information and calculated parameters that are necessary to provide signals to the avionic systems or flight directors shown at 44 and 46.

The probes 16 and 20 have total air temperature sensors 50 built into the struts of the probes, or if desired the total air temperature can be provided from separate probes. The total air temperature sensors 50 provide information inputs to permit calculation of true air speed as shown at block 80T in FIG. 3.

The digital data circuitry for the smart probe 16 carries information to the avionics along a digital line 56. The second set of instrumentation 46 is provided with information from digital data connector or a standard data bus 42 from probe 20 along a digital communication line 58. The information also can be fed to a central flight management system 60 and will include the additional information obtained by the additional features of the present invention. The probes can communicate with each other along a link 54. Also, $Ps_1$ (probe 1) and $Ps_2$ (probe 2) can be compared for redundant Ps differences equating to a yaw measurement.

In this form of the invention, a global positioning satellite receiver circuit card 62 is supported in a receptacle or rack in the housing 28, and it is connected to an external antennae 64 that can be mounted onto the mounting plate 18 of the probe 16. The antennae is usually spaced from the probe barrel sufficiently far so that heat from the probe heaters will not affect it. By mounting the antenna on the mounting plate 18, the assembly reduces the number of holes that have to be formed in the skin 14 of the aircraft. In addition to the GPS receiver, which is indicated by the card 62 in the housing or rack 28 in FIG. 3, the rack 70 supports a magnetometer shown at 66 on the GPS card 62. Solid state accelerometers and rate sensors 68 are provided on a card and are oriented to sense accelerations in three mutually perpendicular axes forming the roll, pitch and yaw axes of the aircraft. The rack forms receptacles in the housing for supporting circuit cards.

GPS receiver circuitry, utilizing the known antennae 64 will provide direct information of latitude, longitude, and ground speed as well as the track of an air vehicle. A moving map display is also standard with a GPS receiver.

Magnetic heading can be obtained with a magnetometer and effects of the magnetic field around the earth can be examined as well.

The initial position system is a series of accelerometers that provide signals in three axes and by appropriately analyzing them they give an inertial measurement of position. The inertial system is a solid state circuit with no moving parts, and all the needed compensation of the signals is provided by the probe CPU circuit card so that there is not any need for providing an onboard computer.

The accelerometer rate cards are shown at 68, and the sensors can be positioned on the card rack 70 so that they will be oriented to properly obtain the accelerations in the three axes that are reference axes for the aircraft.

In addition to the information outlined above, the pitch, roll and yaw of the aircraft are obtainable, by either pressure measurements, or by utilizing information from the inertial guidance accelerometers and global positioning satellite receiver output. The global positioning satellite receiver will provide for a turn rate (rate of change of direction), as well as altitude, as is known.

Figure 3:
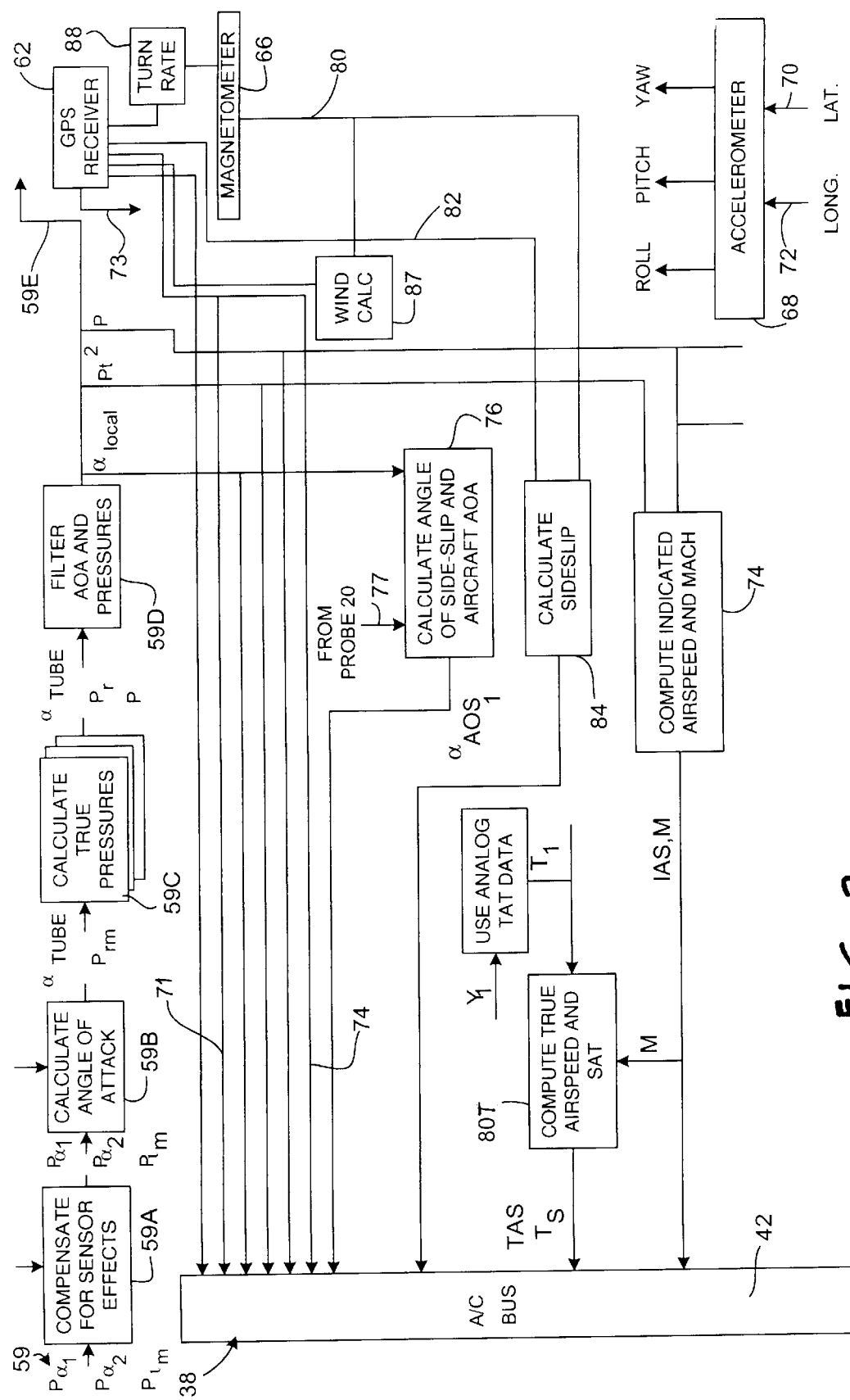
FIG. 3 is a flow chart showing typical information for the calculations occurring in the smart probe system for the flight director arrangement.

FIG. 3 shows representation of functions carried out in a smart probe in the inputs from the pressure sensors indicated at 59 including $P_{\alpha 1}$, $P_{\alpha 2}$, and $P_{tm}$, which are the pressures of the top and bottom ports and the pitot port. These inputs are provided to a circuit 59A for compensation and the pressures are then used for calculating angle of attack of the probe tube as at 59B. Calculating the true pressures is done by adding in factors such as aircraft characterizations, in algorithms that are selected as at 59C. The outputs are filtered at 59D and then used with inputs from a probe on the opposite side of the aircraft for calculating angle of side slip and aircraft angle of attack as shown at 76, which is fed to a bus 42 that is part of the CPU in the smart probe 16. The individual pressure signals from filter 59D also can be carried along line 59E and fed to the bus 42, for use by smart probe 20, or by the processing circuitry in the smart probe 16.

The GPS receiver 62 is represented in FIG. 3, and it provides outputs indicating latitude along a line 69, longitude along line 72, GPS altitude along line 73 and the ground speed along a line 71. These GPS outputs are conventionally provided as readouts with GPS receivers. The signals can be carried to bus 40 and also can be directed to a bus 42 for use by the probe circuitry in housing 30 for probe 20. The magnetometer 66 provides the magnetic heading along line 80 and the track signals indicating the track of the aircraft determined by GPS signals is provided along a line 82 and is combined with the magnetic heading as shown by a block 84 to provide the angle of side slip. The angle of side slip also can be calculated from the pressures sensed on opposite sides of the aircraft, as previously explained. The block 76 would receive a pressure signal from the probe 20, along a line 77 to provide the inputs for calculated angle of side slip based upon pressure sensing.

The GPS receiver further can be used for providing turn rate, and altitude. The turn rate can be calculated utilizing the output from the magnetometer and the GPS receiver as indicated by the box 88. Using the inputs from the GPS receiver 62 and the magnetometer 66, the actual wind direction and velocity can be calculated as indicated by block 87. This calculation can be used to detect changes in the headwind component and thus be used as an early warning wind shear detector.

The accelerometer system indicated at 68 will provide inertial outputs along a line 90, and can be used directly to provide an indication of position from a zero or reference point. The information as to the longitude and latitude from the GPS receiver can be fed to the accelerometer circuitry 68 for compensation.

An inertial navigation unit can be made up of the power supply, the sensor card and the magnetometer. These components are connected to provide navigation control.

The pitch, the roll, and the yaw also can be provided by pressure sensors, as well as the total temperature being provided for compensation purposes. The roll, pitch and yaw also are provided by the accelerometer system 68. The yaw also can be obtained by calculating the side slip, as shown at block 84, which essentially is a direct indication of yaw.

Figure 4:
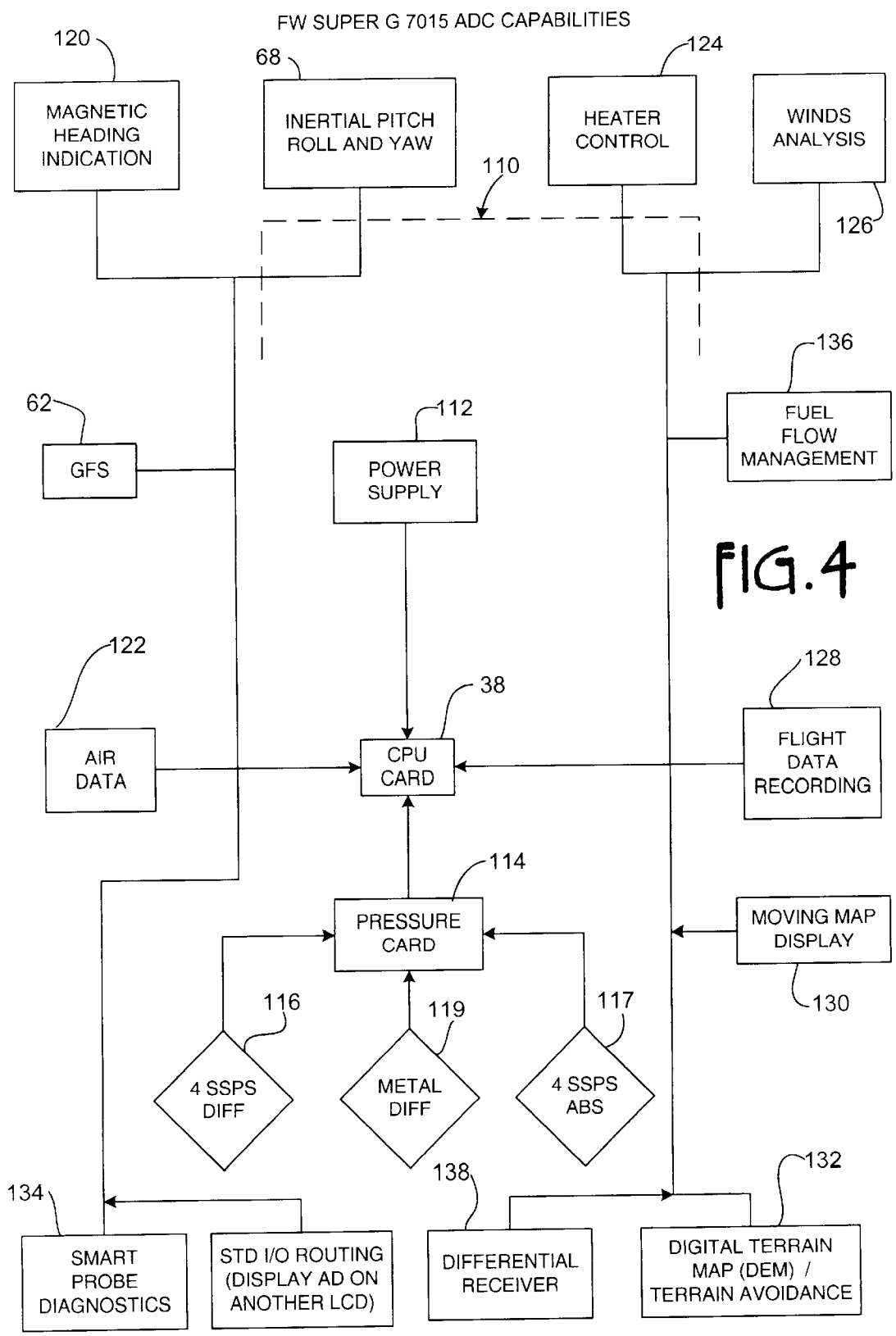
FIG. 4 is a functional block diagram of the features of the present invention.

A block diagram showing a summary of the flight director system is illustrated in FIG. 4. The flight director system illustrated generally at 110 is based upon the utilizing a smart probe with various circuit cards inserted into the housing or frame, including the accelerometer card 68, which is illustrated as providing inertial pitch, roll and yaw, the GPS receiver card 62, which is tied in with the system, and also is used for calculations by the CPU or computer 38, which bears the same number in FIG. 4.

However, a power supply indicated at 112 is also provided, and power is obtained from the aircraft electrical system to provide the suitable filtered and/or regulated voltage for the CPU 38. A pressure card is illustrated at 114 and this is one that resolves pressures from different pressure sensors. Represented in FIG. 4 are solid state pressure sensors 116 that provide differential pressure and solid state pressure sensors 117 that provide absolute pressure 117. The input pressures for sensors 116 and 117 can come from the same ports on the probes. A metal diaphragm differential pressure sensor 119 also can be used. All of these are provided to the circuitry that resolves the pressures as explained in FIG. 3. The pressure card 14 provides suitable signals to the central processor or computer 38, which is part of smart probe 16.

The operating outputs that are obtained from the smart probe include the magnetic heading indication indicated at 120, and the air data 122 which again can come from the pressure sensors, and include indications of angle of attack, angle of side slip, static pressure, pitot pressure, and the like. A central processing unit 38 can provide heater control 124 to the probe heaters, to provide deicing heat. Wind analysis, which was previously explained based upon the magnetic heading and the information from the GPS receiver, is indicated at 126. Flight data recording is indicated at 128, and this can be recorded in real time. A moving map display 130 is a feature of the GPS receiver system, and is common in GPS receivers.

A digital terrain map, and terrain avoidance system is indicated at 132. This is tied in with information from the GPS receiver, as well as information programmed in about the terrain over which the aircraft will fly. Terrain avoidance also can be obtained by radar height altitude gauges, and the GPS system can provide absolute altitude relative to sea level.

A differential receiver 138 provides inputs that can be used on the terrain avoidance system, as well as other systems for operation of the aircraft. The differential receiver 134 aids super accurate GPS position sensing. If desired, a probe diagnostics program can be provided as indicated by 134, for running through a test to make sure that the smart probes are operating properly.

Fuel flow management 136 is tied in with the wind, energy being consumed, and other inputs as desired to calculate endurance of the aircraft.

In FIGS. 5 and 6, a more detailed view of a typical probe used for the present invention is illustrated. A typical smart external air data sensing probe shown at 166 is mounted on a suitable face mounting plate 168 which is attached to the skin of the aircraft. The probe configuration is a curved probe that provides pitot pressure ($P_t$) at a port 167, static pressure ($P_s$), angle of attack (AOA) and the additional features of global positioning satellite information, total air temperature measurement, accelerometer or inertial guidance and a magnetometer.

The probe 166 has angle of attack sensing ports which are typically shown at 169 ($P\alpha$) and 171 ($Pd_2$). The port 169 is on the top, out near the leading end adjacent the pitot pressure port 167. The ports 169 and 171 are positioned so that angle of attack will cause a differential in pressure at the top and bottom ports and there will be a change in this sensed pressure as the angle of attack changes.

The pressures at the ports 169 and 175 along with the pitot pressure provides static pressure as well as other functions indicating aircraft performance utilizing pressure data.

The smart probe 166 has a separate housing or rack 170 mounted on plate 168 of the probe 166. The housing or rack 170 includes operating circuit cards and also has pressure sensors indicted generally at 174 that will provide digital signals for each of the pressures sensed at the ports 167, 169 and 171. The signals are provided to a digital processor circuitry 173 (CPU) that has an A/D converter and which will provide information to desired data connections or a data bus. The processor circuitry 173 also can have digital data circuits or buses for outputting the processed information and calculated parameters that are necessary to provide signals to the avionic systems or flight directors as shown in FIG. 1.

The probe 166 has a total temperature sensor input opening 176 in the leading edge of the probe 166. Passageways shown at 178 provide for a flow over a sensor 180 in the passageways. The total temperature sensor provides an input to permit calculation of true air speed.

In this form of the invention, a global positioning satellite receiver circuit card 182 is supported in the housing 170 and it has an external antennae 184 that can be mounted onto the mounting plate 168 of the probe 166. The antennae 184 is usually spaced from the probe barrel sufficiently far so that heat from the probe heaters will not affect it. By mounting the antennae on the mounting plate 18, the assembly reduces the number of holes that have to be formed in the skin of the aircraft. In addition to the GPS receiver, which is indicated by the card 182 in the housing or rack 170 in FIG. 1, the rack 70 supports a magnetometer shown at 186. Solid state accelerometers are provided on a card and are oriented to sense accelerations in three mutually perpendicular axes forming the roll, pitch and yaw axes of the aircraft.

GPS receiver circuitry, utilizing the known antennae 184 will provide direct information of latitude, longitude, and ground speed as well as the track of an air vehicle. A moving map display is also standard with a GPS receiver.

Magnetic heading can be obtained with the magnetometer 186 and effects of the magnetic field around the earth can be examined as well.

The housing 170 also has pressure sensors 188 that sense the pressure from ports 167, 169 and 171 to provide outputs. A power supply card 190 provides power for the CPU and GPS cards. A separate power supply 192 is used for the pressure sensors. A sensor circuit card 194 also is mounted in the housing 170.

The accelerometer cards are shown at 68, and the sensors can be positioned on the card rack 70 so that they will be oriented to properly obtain the accelerations in the three axes that are references axes for the aircraft.

In addition to the information outlined above, the pitch, roll and yaw of the aircraft are obtainable, by either pressure measurements, or by utilizing information from the inertial guidance accelerometers and global positioning satellite receiver output. The global positioning satellite receiver will provide for a turn rate (rate of change of direction), as well as altitude, as is known.

The functions carried out in smart probe 176 are as shown in FIG. 3 using the inputs $P_{\alpha 1}$, $P_{\alpha 2}$, and $P_{tm}$, which are the pressures of the top and bottom ports 169 and 171 and the pitot port 167. The GPs and total air temperature sensor inputs are used in the same manner.

The addition of a GPS receiver thus provides a wide range of additional information that can be combined on a unitary smart probe, utilizing less holes in the aircraft in that the antennae can be installed with the air data sensing probe, and the central processing unit needed for processing the signals is mounted in a card right at the smart probe. Two smart probes can be utilized, or more, as desired for obtaining redundancy and other needed information.

Although the present invention has been described with reference to preferred embodiments, workers skilled in the art will recognize that changes may be made in form and detail without departing from the spirit and scope of the invention.

What is claimed is:

1. A probe assembly for an aircraft including an air data sensing probe, a mounting plate for said probe, a housing mounted on said mounting plate on an interior side of the mounting plate opposite from the probe and having receptacles for receiving circuit cards, a global positioning satellite receiver card in one of the receptacles, and a global positioning satellite antenna mounted on the mounting plate on the same side as the probe and coupled to the global positioning satellite receiver card.

2. The probe assembly of claim 1 including a central processing unit for processing information from the global positioning satellite receiver, and combining the information processed with signals including magnetic heading for determining the side slip of the aircraft.

3. The probe assembly of claim 1 including a central processing unit for receiving signals indicating longitude and latitude from the global positioning satellite receiver, and combining the signals with accelerometer inputs for navigating the aircraft.

4. The probe assembly of claim 1 and a circuit card comprising a three axes accelerometer mounted in said housing.

5. The probe assembly of claim 1, wherein the air data sensing probe comprises a probe having a pitot sensing port at its outer end, and a pressure sensor for providing a signal indicative of the pitot pressure sensed at the pitot pressure sensing port, said pressure sensor being mounted in said rack.

6. The probe assembly of claim 5, wherein the probe has a forward edge facing an air flow direction, an inlet port formed in the forward edge, said inlet port leading to an internal passageway defined in the probe, an exhaust outlet from the passageway, and a total air temperature sensor mounted in the passageway for providing a signal indicating total air temperature.

7. The probe assembly of claim 1, and a pair of angle sensing ports on the probe positioned to sense differential pressure when a bisecting plane perpendicular to a plane defined by axes of the angle sensing ports is at an angle relative to the direction of air flow, and pressure sensors for sensing the differential pressure between the angle sensing ports, said pressure sensors for sensing differential pressure being mounted in a card in the housing.

8. The probe assembly of claim 7, wherein there is a central processing unit supported in a receptacle in the housing, and a power supply mounted in one of the receptacles in the housing for powering the sensors, the global positioning satellite receiver, and the central processing unit.

9. The probe assembly of claim 8, and a plurality of accelerometers on a circuit card, said accelerometers being connected to the central processing unit, and the circuit card for the accelerometers being mounted in a receptacle in the housing.

10. The probe assembly of claim 1, wherein said air data sensing probe comprises a curved probe having a base, and leading and trailing edges that curve outwardly from the base and are formed to provide a barrel that extends generally parallel to the base.

11. The probe assembly of claim 1, wherein said global positioning satellite antenna mounted on the mounting plate for the probe is spaced from the probe to sufficiently be out of the influence of probe heaters.

12. An air data sensing assembly for aircraft, comprising an air data sensing probe, a mounting plate supporting the probe, the mounting plate fitting into an opening in the aircraft skin such that the probe protrudes externally of the aircraft, and a global positioning satellite antenna mounted on the same plate as the probe, and extending to the exterior of the aircraft through the same opening as the opening for the mounting plate.

13. The air data sensing probe of claim 12, wherein the mounting plate mounts a housing that is positioned on an opposite side of the plate from the probe and global positioning satellite antenna, said housing forming a rack mounting circuit cards, a global positioning satellite receiver circuit card connected to the global positioning satellite receiver antenna, circuit cards having sensors for sensing pressures from the probe, and a processor circuit card for processing signals from the sensor circuit card and from the global positioning satellite receiver circuit card, the circuit cards all mounted in the rack.

14. The air data sensing probe of claim 13, wherein the housing includes a magnetometer circuit card for determining magnetic heading, the processor processing the information from the global positioning satellite receiver card and combining the outputs of the global positioning satellite receiver card and the magnetometer circuit card to determine the side slip of the aircraft.

15. The air data sensing probe of claim 14, an accelerometer circuit card providing inertial navigation signals, and wherein the central processing unit receives signals indicating longitude and latitude from the global positioning satellite receiver card, and combines the longitude and latitude signals with accelerometer inertial navigation signals for navigating the aircraft.

16. The air data sensing probe of claim 13, wherein the probe comprises a probe body and a barrel portion, said body being positioned between the barrel portion and the mounting plate, an opening in a leading edge of the body relative to the air stream against which the air stream impinges, a passageway in the body having an exhaust opening on a trailing edge of the body, a total air temperature sensor passageway for sensing total air temperature, and a pressure sensor card supported in the rack in the housing for receiving signals from the total air temperature sensor and providing signals to the processor circuit card.

17. An air data sensing probe assembly comprising a unitary probe extending into an air stream, said probe having a plurality of pressure sensing ports thereon, a mounting plate for said probe, said mounting plate being adapted to be mounted onto a wall of an aircraft such that the probe extends through a hole in the wall of the aircraft, a circuit card housing supported on the mounting plate on an opposite side of the mounting plate from the probe, a plurality of pressure sensors formed on a circuit card and mounted in the housing, a global positioning satellite antenna supported on the mounting plate and extending on the same side of the mounting plate as the probe, a global positioning satellite receiver circuit card mounted in said housing and coupled to the global positioning satellite antenna, a central processor mounted in the housing for receiving signals from the pressure sensors, and the global positioning satellite receiver card, the central processor providing output signals used for navigating the aircraft, an inlet opening in the probe leading to an internal duct, said inlet opening being on a leading edge of the probe, a total air temperature sensor mounted in the internal duct, said total air temperature sensor being connected to a temperature sensor in the housing which provides temperature signals to the central processor, and the housing, probe and mounting plate comprising a single package mounted as a unit, and having a single electrical coupling leading from the housing and positioned on the side of the mounting plate opposite from the probe.

\* \* \* \* \*